US011446637B2

(12) United States Patent
Yang et al.

(10) Patent No.: US 11,446,637 B2
(45) Date of Patent: Sep. 20, 2022

(54) BI-METALLIC THREE-WAY CATALYST MATERIALS AND APPURTENANT DEVICES AND SYSTEMS

(71) Applicant: GM GLOBAL TECHNOLOGY OPERATIONS LLC, Detroit, MI (US)

(72) Inventors: Ming Yang, Novi, MI (US); Se H. Oh, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 16/904,724

(22) Filed: Jun. 18, 2020

(65) Prior Publication Data

US 2021/0394159 A1 Dec. 23, 2021

(51) Int. Cl.
| | |
|---|---|
| *B01J 21/04* | (2006.01) |
| *B01J 21/06* | (2006.01) |
| *B01J 23/42* | (2006.01) |
| *B01J 23/46* | (2006.01) |
| *B01J 35/00* | (2006.01) |
| *B01J 37/02* | (2006.01) |
| *F01N 3/10* | (2006.01) |
| *F01N 3/28* | (2006.01) |

(52) U.S. Cl.
CPC ............ *B01J 23/464* (2013.01); *B01J 23/42* (2013.01); *B01J 35/006* (2013.01); *B01J 37/0207* (2013.01); *F01N 3/101* (2013.01); *F01N 3/2807* (2013.01); *B01J 21/04* (2013.01); *B01J 21/066* (2013.01); *F01N 2370/02* (2013.01)

(58) Field of Classification Search
CPC ........ F01N 3/101; F01N 3/2807; B01J 21/04; B01J 21/066; B01J 23/42; B01J 23/464; B01J 35/006; B01J 37/0207
See application file for complete search history.

(56) References Cited

U.S. PATENT DOCUMENTS

| | | | | |
|---|---|---|---|---|
| 3,953,368 A | * | 4/1976 | Sinfelt | B01J 35/10 502/223 |
| 4,187,168 A | * | 2/1980 | McVicker | C10G 49/06 585/407 |
| 6,171,999 B1 | * | 1/2001 | Takemoto | B01D 53/945 502/332 |
| 7,169,735 B2 | * | 1/2007 | Sagae | B01J 37/0205 502/262 |
| 7,576,029 B2 | * | 8/2009 | Saito | B01J 37/16 502/302 |
| 7,582,586 B2 | * | 9/2009 | Fanson | B01J 37/0018 502/185 |
| 10,159,960 B2 | * | 12/2018 | Yang | B01J 37/0236 |
| 10,464,047 B2 | * | 11/2019 | Lopez Quintela | H01L 31/035218 |

(Continued)

*Primary Examiner* — Cam N. Nguyen
(74) *Attorney, Agent, or Firm* — Quinn IP Law

(57) ABSTRACT

Bimetallic three-way catalyst devices include a support body, one or more Rh bulk deposits disposed on the support body, and a plurality of Pt atomic clusters disposed on the surface of each of the Rh bulk deposits. Substantially no Pt is deposited on the support body. At least 85% by weight of the Pt atomic clusters comprise up to 10 atoms and the maximum Pt atomic cluster size is 200 Pt atoms. The combined loading of Rh and Pt can be less than 1.5% by weight relative to the weight of the support body. The molar ratio of Rh in a bulk Rh deposit to Pt disposed on the surface of that deposit is at least 5:1.

20 Claims, 5 Drawing Sheets

(56) References Cited

U.S. PATENT DOCUMENTS

| | | | |
|---|---|---|---|
| 10,576,460 B2* | 3/2020 | Toyama | B01D 53/945 |
| 10,753,247 B2* | 8/2020 | Yang | F01N 3/10 |
| 10,994,264 B2* | 5/2021 | Mazoyer | B01J 37/08 |
| 11,014,073 B2* | 5/2021 | Egashira | B01J 29/12 |
| 2019/0257232 A1 | 8/2019 | Yang et al. | |
| 2020/0094228 A1* | 3/2020 | Yasumatsu | B01J 23/462 |
| 2020/0391185 A1* | 12/2020 | Lou | B01J 37/088 |
| 2021/0016256 A1* | 1/2021 | Liu | B01J 37/035 |
| 2021/0316290 A1* | 10/2021 | Pedireddy | B01J 23/745 |
| 2021/0331144 A1* | 10/2021 | Takeda | B01J 29/7015 |

* cited by examiner

BI-METALLIC THREE-WAY CATALYST MATERIALS AND APPURTENANT DEVICES AND SYSTEMS

INTRODUCTION

Platinum group metal (PGM) catalysts, particularly those including rhodium, platinum, and palladium, catalysts are commonly used in gasoline and diesel automotive emissions aftertreatment systems to convert (e.g., oxidize, reduce) various constituents of exhaust gas, such as carbon monoxide (CO), unburned and partially-burned hydrocarbons (HC), and nitrogen oxides. Such catalysts typically comprise a bi-metallic and tri-metallic alloys (e.g., Pt—Pd, Pt—Rh, and Pt—Pd—Rh alloys) disposed on a high surface area support (e.g., alumina).

SUMMARY

Catalytic devices are provided, and can include a support body, one or more Rh bulk deposits disposed on the support body, and a plurality of Pt atomic clusters disposed on the surface of at least one of the Rh bulk deposits. At most 10% by weight of the Pt atomic clusters can be disposed directly on the support body. The Pt atomic clusters can be deposited onto the surface of the one or more Rh bulk deposits by contacting the support body and the one or more Rh bulk deposits with a solution or slurry comprising complexed Pt ions. Prior to the deposition of Pt atomic clusters on to the surface of the one or more Rh bulk deposits, the support body can be pH-adjusted to exhibit a charge which is repulsive to the Pt ions in the slurry or solution. The one or more Rh bulk deposits can have diameters of about 0.2 nanometers to about 3 nanometers. At least 85% by weight of the Pt atomic clusters can be up to 10 atoms. The support body can be of a metal oxide and/or a ceramic material. The support body can be $Al_2O_3$, $ZrO_2$, and combinations thereof. The support body can be doped with one or more of La and Nd. The molar ratio of Rh in a bulk Rh deposit to Pt disposed on the surface of that deposit can be at least 5:1. The catalytic device comprises can be three-way catalyst.

Catalytic devices are provided and can include a support body, one or more Rh bulk deposits disposed on the support body, and a plurality of Pt atomic clusters disposed on at least one of the Rh bulk deposits. At least 85% by weight of the Pt atomic clusters can be up to 10 Pt atoms, and the maximum Pt atomic cluster size can be 200 Pt atoms. At least 85% by weight of the Pt atomic clusters can be up to 5 Pt atoms. The maximum Pt atomic cluster size can be 50 atoms. Less than 10% by weight of Pt atomic clusters can be disposed directly on the support body. The molar ratio of Rh in a bulk Rh deposit to Pt disposed on the surface of that deposit can be at least 5:1. The internal combustion engine can power a vehicle.

Bimetallic three-way catalyst devices (TWC) configured to treat exhaust gas generated by a gasoline internal combustion engine are provided, and can include a canister, a non-metal support body disposed within the canister, a plurality of Rh bulk deposits disposed on the support body, and a plurality of Pt atomic clusters disposed on at least one of the Rh bulk deposits. At least 85% by weight of the Pt atomic clusters can be up to 10 Pt atoms, and the maximum Pt atomic cluster size can be 200 Pt atoms. The combined loading of Rh and Pt can be less than 1.5% by weight relative to the weight of the support body. The gasoline internal combustion engine can power a vehicle. The molar ratio of Rh in a bulk Rh deposit to Pt disposed on the surface of that deposit can be at least 5:1.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Bi-metallic, and generally polymetallic, metal catalysts typically comprise irregular metallic distributions that can lead unpredictable, low, or non-optimized catalytic activity. Further, catalytic systems comprising Rh catalytic metal deposited on metal oxide (e.g., alumina) supports can lead to undesired sequestration of Rh due to the Rh reacting with support to form catalytically inactive, oxygen-coordinated Rh species Provided herein are catalyst materials and appurtenant devices which exhibit high catalytic activity and efficient usage of catalytic metals. The catalyst materials can be manufactured using energy-efficient methods which combine desired catalytic metals with atomic precision. In particular, three-way catalyst devices (TWC) exhibiting high exhaust gas conversion performance are provided.

Figure 1:
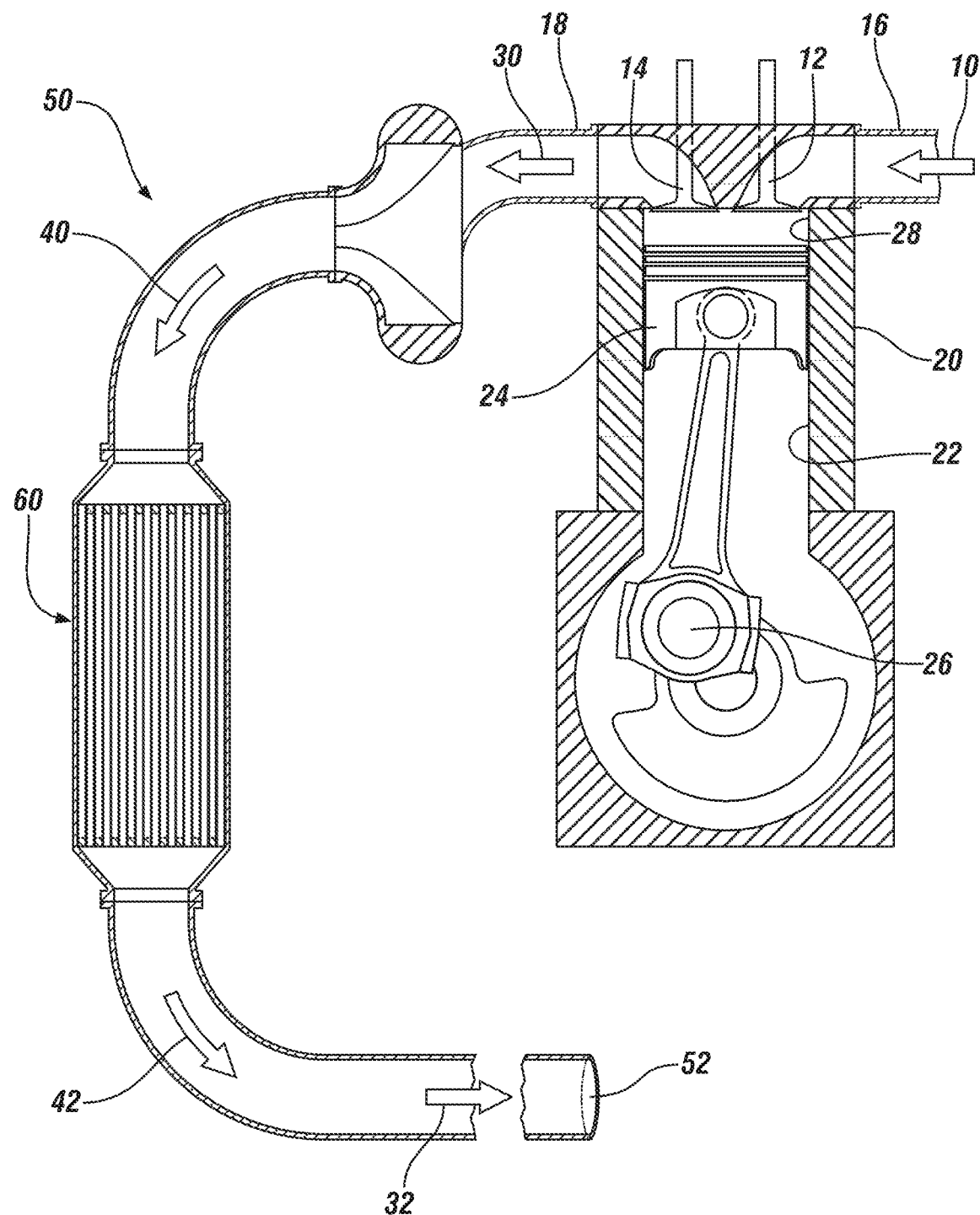
FIG. 1 illustrates an exhaust gas treatment system appurtenant to an internal combustion engine, according to one or more embodiments.

FIG. 1 illustrates a TWC 60 appurtenant to exhaust gas treatment system 50. System 50 is configured to receive and treat exhaust gas 30 generated by internal combustion engine (ICE) 20. TWC 60 can include close-coupled TWCs, underfloor TWCs, and others as will be known by those of skill in the art. A mixture of air and fuel 10 enters ICE 20 and exits as an exhaust gas 30. The exhaust gas stream 40 then passes through the exhaust gas treatment system 50. In general, TWC 60 is configured to oxidize carbon monoxide (CO) and hydrocarbons (HC) present in exhaust gas 30 into carbon dioxide ($CO_2$) and water, and additionally reduce one or more nitrogen oxide (NOx) species present in exhaust gas. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

ICE 20 can be configured to power a vehicle (not shown). The multi-cylinder, reciprocating piston ICE 20 may be a spark ignition direct injection ICE (i.e., gasoline ICE, which may or may not contain an in-cylinder fuel injector), or a homogeneous charge compression ignition ICE. Each of these types of ICEs includes one or more cylinders 22 that accommodate reciprocating piston heads 24 connected to a crankshaft 26. Located above each piston head 24 is a combustion chamber 28 that receives a mixture of air and fuel 10 through an intake valve 12 at specifically timed intervals. The ignition of the air and fuel mixture 10 in the combustion chambers 28 invokes rapid downward linear movement of their respective piston heads 24 to drive rotation of the crankshaft 26. The reactive upward movement of each piston head 24 expels the combustion products from each combustion chamber 28 through an exhaust valve 14.

ICE 20 is supplied with a continuous air flow at a variable mass flow rate responsive to ICE performance demands (e.g., pressing and depressing a foot pedal located in the driver-side compartment to achieve desired vehicle speed and acceleration). A desired quantity of fuel is intermittently injected into an incoming air flow just upstream from the ICE 20, as dictated, for example, by an ICE control strategy, to produce a mixture of air and fuel that exhibits the instantly desired air to fuel mass ratio (not shown). For example, the quantity of fuel injected into the incoming air flow can be controlled to maintain a lean air to fuel mass ratio or a rich air to fuel mass ratio, or to switch between the two states.

The mixture of air and fuel 10 enters an intake manifold 16 of the ICE 20 and exits as an exhaust gas 30 through the exhaust manifold 18. The intake manifold 16 delivers the air and fuel mixture 10 into the combustion chambers 28 through the intake valve 12 and then to the cylinders 22 of the ICE 20. The air and fuel mixture 10 is compressed, heated, and thereby ignited to power the reciprocating piston heads 24 in the cylinders 22 of the ICE 20. The spent combustion products are expelled from the cylinders 22 of the ICE 20 by the exhaust strokes of the pistons 24 and into the exhaust manifold 18 through the exhaust valve 14. The exhaust manifold 18 delivers the combustion products to the exhaust gas treatment system 50 as the exhaust gas 30. The treatment system 50 communicates the exhaust gas 30 to TWC 60 for the effective conversion of exhaust gas 30 constituents (e.g., CO, HC, and NOx).

Figure 2:
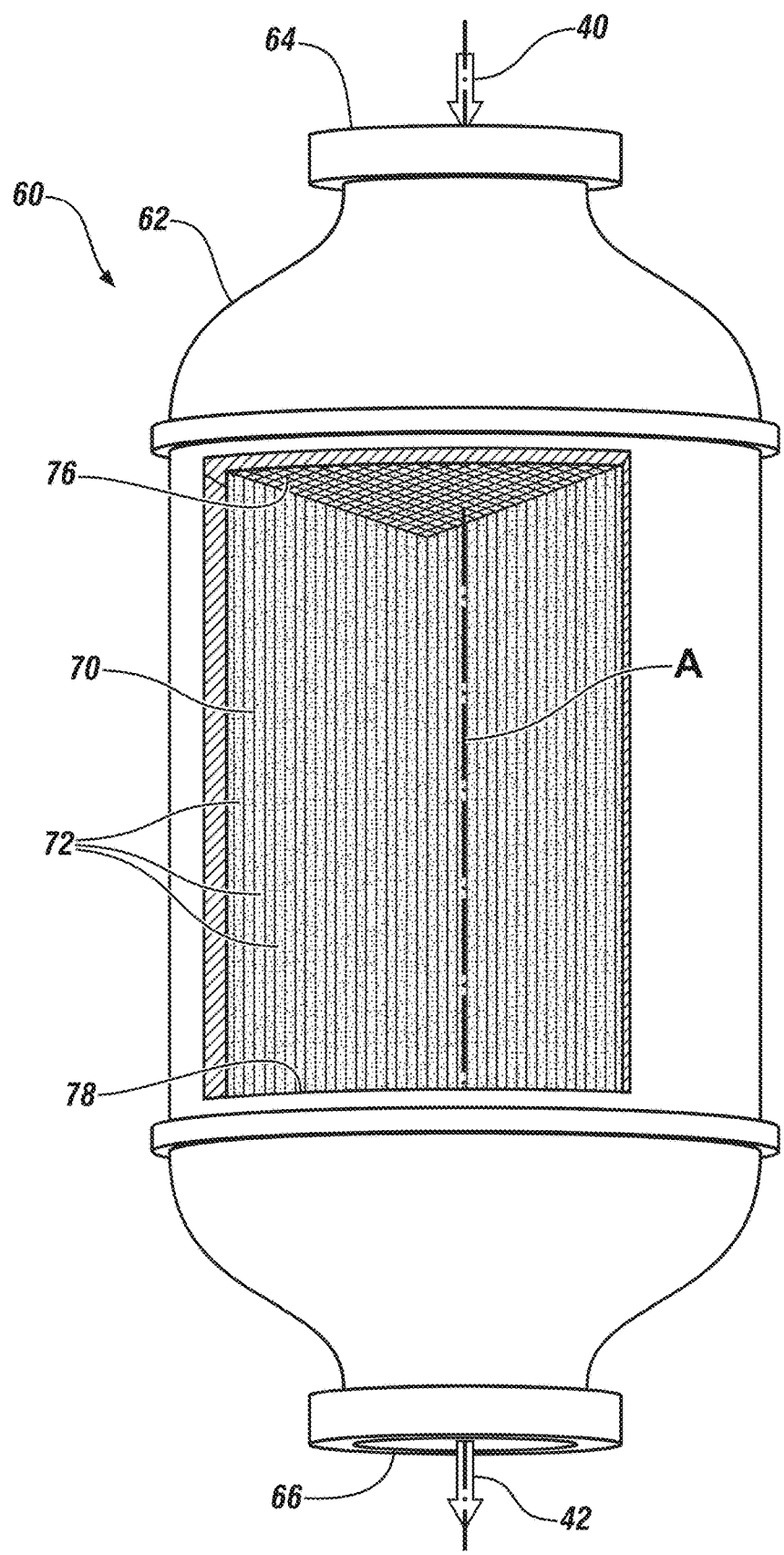
FIG. 2 illustrates a three-way catalyst device, according to one or more embodiments.
Figure 3:
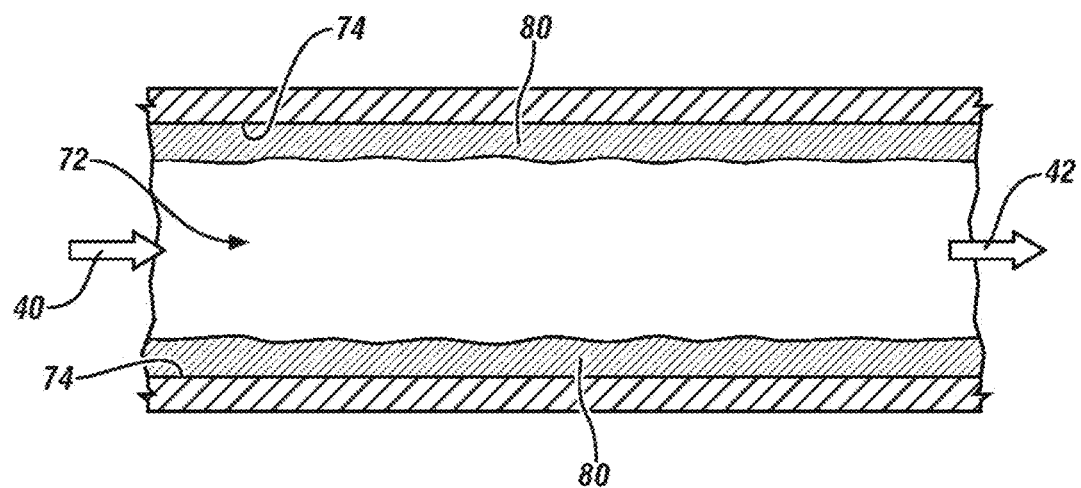
FIG. 3 illustrates a cross sectional view of a three-way catalyst device, according to one or more embodiments.

As shown in FIGS. 1-3, the exhaust gas stream 40 enters TWC 60 and passes through the support body 70, which can comprise flow-through channels 72, for example, defined by walls 74. TWC 60 comprises catalyst material disposed on the support body 70. Support body 70 is a generally porous, non-metal (i.e., a material which is not an elemental metal or metal alloy) material, such as a metal oxide or ceramic material. In some embodiments, support body 70 comprises one or more of alumina, silica, ceria, zirconia, titania, lanthana, and zeolite. In some embodiments, one or more of alumina, silica, ceria, zirconia, titania, lanthana, and zeolite can be doped with La and Nd. In some embodiments, the support body 70 comprises a catalytically inert frame or substrate (e.g., a cordierite frame) onto which the previously described porous, non-metal support material is applied (e.g., via a washcoat). The high-surface area of the metal oxide and/or ceramic material creates sufficient contact between the exhaust gas 30 and the catalyst material for the desired oxidation and reduction reactions to occur. The exhaust gas treatment system 50 then communicates the exhaust gas stream 40 from TWC 60 as a treated exhaust gas stream 42. The treated exhaust gas 32 is expelled from the treatment system 50 through a vent 52 (e.g., a vehicle tail pipe), for example to the ambient atmosphere.

A suitable TWC 60 for the catalyzed reactions disclosed herein is shown in FIG. 2 and is piped within the exhaust gas treatment system 50 to facilitate continuous passage of the exhaust gas stream 40 therethrough. TWC 60 can further include a shell or canister 62 comprising a substantially inert material, relative to the exhaust gas constituents, such as stainless steel or other metal alloys. Canister 62 is shaped with an upstream inlet 64 for exhaust gas 30 entry, and a downstream outlet 66 for exhaust gas 30 expulsion. The body of the canister 62 can be round or elliptical in cross-section, although other configurations are practicable, and sized to hold a support body 70 to which catalyst material is applied. In FIG. 2, a wedge portion of the canister 62 and the catalyst-coated support body 70 have been cut-away to better reveal the internal channels 72 extending therethrough.

The support body 70 is shown in FIG. 2 as a honeycomb-shaped monolith with an inlet face 76 and an outlet face 78 transverse to the exhaust gas stream 40 (that is, along the flow axis A), and includes several small, square, parallel flow-through channels 72 defined by walls 74 which extending longitudinally from the inlet face 76 to the outlet face 78 of the support body. Since each channel 72 is small in cross-section for admitting the exhaust gas stream 40, the inlet face 76 of the support body is sized to provide a suitable number of channels 72 to collectively accommodate a desired flow rate for the exhaust gas stream 40. For example, the support body 70 may contain about 400 to 900 channels 72 per square inch of inlet face 76 cross-sectional area. While extruded ceramic, honeycomb-shaped monoliths have proven effective and durable for catalysts, other catalyst support bodies of different materials and geometric configurations may be used and are germane to the embodiments herein.

Catalyst material are generally disposed on support body 70. In a non-limiting example, as shown in FIG. 3, small particles of the catalyst material, depicted by layer 80, are deposited on the walls 74 of the flow-through channels 72. In general, bimetallic catalysts promote oxidation and reduction of target species (e.g., CO, HC, NOx), for example between contiguous catalytic metals (e.g., Pt, Pd). Accordingly, suitable bimetallic catalysts maximize the accessibility (i.e., surface area) of contiguous catalytic metal formations such that contact with a pollutant stream (e.g., exhaust gas 30) is similarly maximized.

Figure 4:
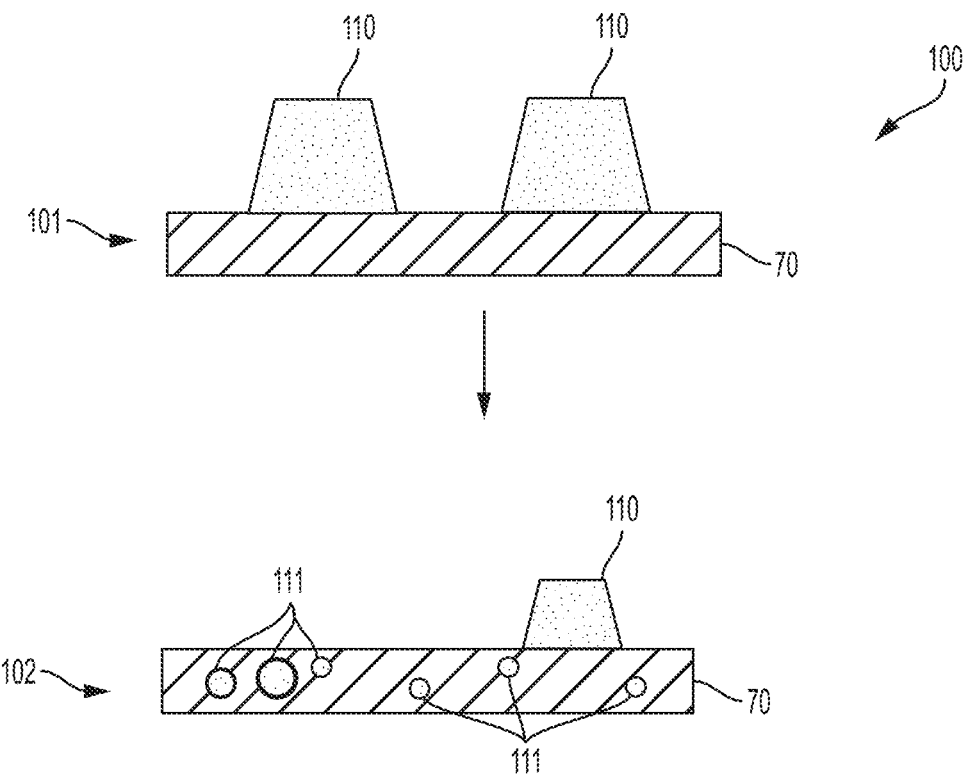
FIG. 4 illustrates a lifecycle of a prior art three-way catalyst, according to one or more embodiments.

FIG. 4 illustrates a lifecycle 100 of a prior art TWC comprising a Rh-based catalytic material on a support body 70. An early-life (i.e., low use) TWC 101 comprises bulk deposits 110 of Rh on a support body 70 (e.g., an alumina support body). A late-life (i.e., high use) TWC 102 illustrates migration of Rh from the bulk deposits 110 resulting in sequestered, inactive Rh clusters 111 within the support body 70. Accordingly, the late-life TWC 102 exhibits significantly inferior catalytic performance relative to the early-life TWC 101.

Figure 5:
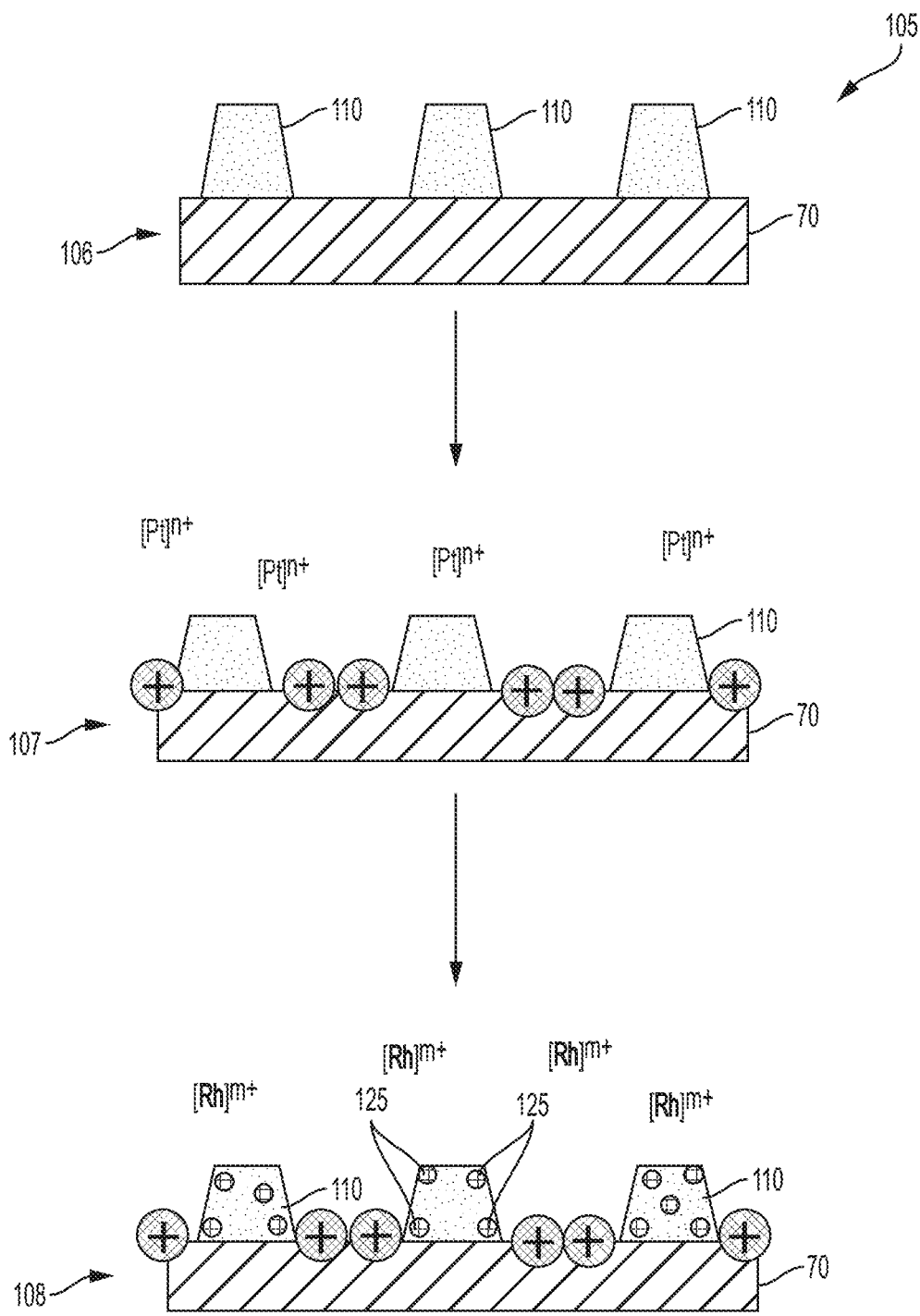
FIG. 5 illustrates a method for preparing a three-way catalyst material, according to one or more embodiments.

FIG. 5 illustrates a facile method 105 for producing high efficiency bimetallic catalytic structures and systems which is more energy efficient and precise than conventional methods for preparing Rh—Pt catalytic systems. Bulk deposits 110 of Rh are allocated 106 onto support body 70, for example using known processes such as impregnation, ion adsorption, and precipitation. Bulk deposits 110 which are treated per method 105 can be as small as about 0.2 nanometers in diameter. In some embodiments, bulk deposits 110 which are treated per method 105 can be about 0.2 to about 2 nanometers in diameter, about 0.2 to about 2.5 nanometers in diameter, or about 0.2 to about 3 nanometers in diameter. Bulk deposits 110 can be optionally calcinated to produce superficial elemental metal on bulk deposits 110. If required, the surface of bulk deposits 110 are reduced for example by an optional additional or alterative treatment with/to calcination. Reducing treatments can include exposure to $H_2$ at temperatures below about 200° C., exposure to a $NaBH_4$ solution, exposure to $H_2O_2$ in solution, or exposure to ethanol, among others. The support body 70 and its appurtenant bulk deposits 110 are exposed 107 to a solution or slurry comprising Pt ions. Pt ions can be complexed with various ligands, for example. The solution or slurry can be temperature-controlled. Prior to exposure 107 of the solution or slurry, the pH of the catalyst support 70 can be adjusted (e.g., by applying acids or bases) to exhibit a charge which is repulsive to Pt ions. For example, if Pt ions in the solution or slurry are positive, the catalyst support 70 will be disposed to exhibit a positive charge.

Galvanic exchange 107 thereafter occurs between the Rh bulk deposits 110 and the Pt ions in the solution or slurry, effecting deposition of atomic clusters 125 of Pt on the surface of the Rh bulk deposits 110. During galvanic exchange 107, the solution or slurry may comprise Rh ions and Pt ions. Deposition of Pt ions (i.e., as atomic clusters 125) may be highly controlled by many aspects. In a first aspect, the repulsive charge of support body 70 ensures that no, or substantially no (i.e., negligible), errant depositions of Pt occur thereto. In a second aspect, galvanic exchange 107 via the solution or slurry effects deposition of Pt atomic clusters 125 entirely, or substantially, to the surface of bulk deposits 110, rather than inaccessibly imbedding Pt into bulk deposits 110 of Rh. Accordingly, the locations of Pt atomic clusters 125 are substantially optimized for catalytic activity.

In a third aspect, the complexing ligands shift the free energy of the galvanic exchange such that no galvanic exchange occurs below a particular temperature. Accordingly, ligand selection and temperature control of the solution or slurry during galvanic exchange 107 allow for strict control of Pt deposition rate and mass. For the purposes of non-limiting illustration, a suitable Pt-ligand complex can comprise one or more of Tetraammineplatinum(II) hydrogen carbonate, Tetraammineplatinum(II) chloride monohydrate, Tetraammineplatinum(II) nitrate, Tetraammineplatinum(II) hydroxide, Tetraammineplatinum(II) chloride, or Tetraammineplatinum(II) chloride monohydrate, among others. For the purposes of non-limiting illustration, a suitable Rh-ligand complex can comprise one or more of Rhodium(III) chloride hydrate, Rhodium(III) iodide, Rhodium(II) acetate, Rhodium(III) chloride, or Rhodium(III) nitrate, among others.

Subsequent to galvanic exchange 107, the support body 70 and its appurtenant metal deposits (e.g., bulk deposits 110 and atomic clusters 125) can be rinsed to provide a highly catalytically active and stable bimetallic TWC 60. In reference to FIG. 3, catalyst material 80 can comprise one or a plurality of Rh bulk deposits 110 superficially impregnated with Pt atomic clusters 125. In some embodiments, the combined loading of Rh and Pt is less than about 1.5%, less than about 1.25%, or less than about 1% by weight relative to the weight of the support body.

Atomic clusters 125 are substantially uniform in size and are disposed substantially at least on the surface of each of the Rh bulk deposits 110 (i.e., no more than 10% by weight of Pt is directly disposed on the surface of support body 70). The Pt atomic clusters 125 can be deposited onto the surface of Rh bulk deposits 110 via galvanic exchange. The Pt atomic clusters 125 can be deposited onto the surface of the Rh bulk deposits 110 by contacting the latter with a solution or slurry comprising complexed Pt ions.

In some embodiments, atomic clusters 125 generally each comprise at most 10 metal Pt. For example, at least about 85% or at least about 90% by weight of the Pt atomic clusters 125 comprise at most 10 atoms. In some embodiments, atomic clusters 125 generally each comprise at most 5 Pt atoms. For example, at least about 85% or at least about 90% by weight of the Pt atomic clusters 125 comprise at most 5 atoms. The maximum size of any Pt atomic cluster 125 is 200 Pt atoms, in some embodiments. In some embodiments, the maximum size of any Pt atomic cluster is at most about 100 Pt atoms, at most about 50 Pt atoms or at most about 20 Pt atoms. In some embodiments, the molar ratio of Rh in a bulk Rh deposit 110 to Pt disposed on the surface of that deposit is at least 5:1.

Example 1

A first conventional TWC and a second TWC comprising catalyst material conforming the embodiments disclosed herein were aged and exposed to exhaust gas streams to determine the catalytic performance of each TWC. The first TWC comprised a baseline Rh TWC comprising Rh at a 0.75% by weight loading on an alumina support. The second OC comprised a Rh—Pt catalyst on an $Al_2O_3$ support body, with a Rh:Pt molar ratio of 10:1 and a catalytic material loading of 0.75% by weight relative to the support body. In two trials, a TWC with a total support and catalytic metal weight of 20 mg was exposed to exhaust gas streams comprising 5000 ppm CO, 500 ppm $C_3H_6$, 500 ppm NO, 0.4% $O_2$, 5% $H_2O$, and the balance $N_2$. The exhaust gas was delivered to the TWCs at a flow rate of 500 mL/minute. Each TWC was reduced by 10% $H_2$ at 300° C. for 30 minutes before each trial. The temperature of the TWC-exhaust gas system from ramped from 100° C. to 450° C. at a rate of 2° C./min.

Figure 6A:
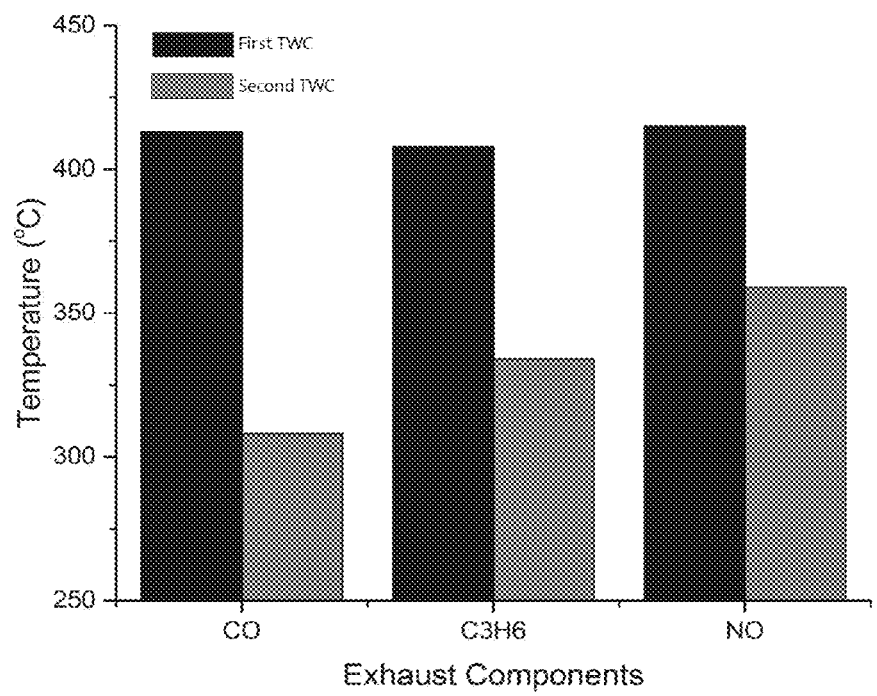
FIG. 6A illustrates light-off temperature data for two three-way catalyst devices, according to one or more embodiments.
Figure 6B:
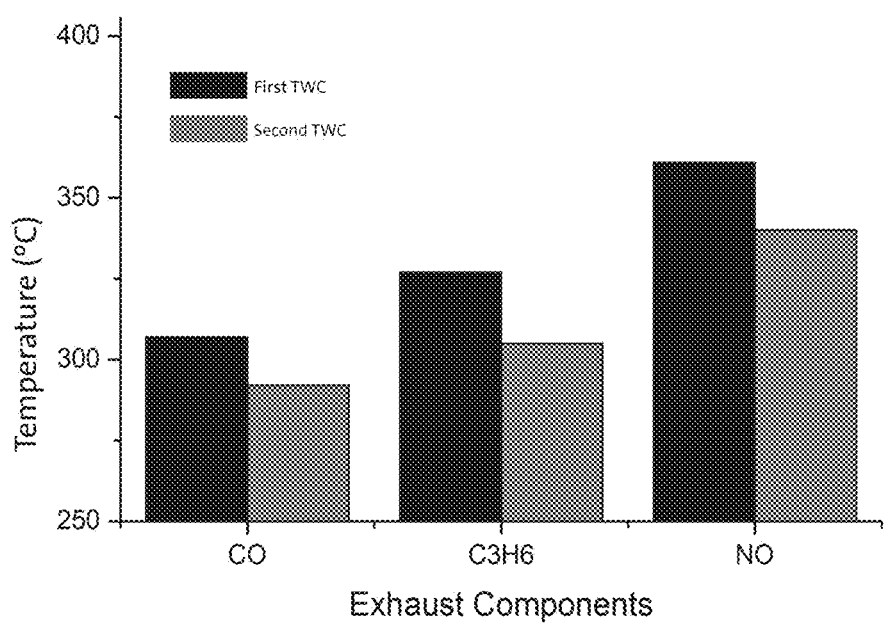
FIG. 6B illustrates exhaust gas concentration data for exhaust gas treated by two three-way catalyst devices, according to one or more embodiments.

FIG. 6A illustrates CO, $C_3H_6$, and NO light-off temperature data for the first and second TWCs, wherein the light-off temperature represents the temperature at which the TWC oxidizes 50% of CO and $C_3H_6$, and reduces 50% NO. A lower light-off temperature represents higher catalytic performance and is more desirable, particularly for automotive applications. FIG. 6B illustrates light off temperature data for exhaust gas treated by each TWC after three 30-minute test cycles at a constant temperature of 350° C.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A catalytic device, the device comprising:
a support body formed from a porous non-metal material;
one or more Rh bulk deposits disposed on the support body; and
a plurality of Pt atomic clusters disposed on the surface of at least one of the Rh bulk deposits, wherein at most 10% by weight of the Pt atomic clusters are disposed directly on the support body.

2. The catalytic device of claim 1, wherein the Pt atomic clusters are deposited onto the surface of the one or more Rh bulk deposits by contacting the support body and the one or more Rh bulk deposits with a solution or slurry comprising complexed Pt ions.

3. The catalytic device of claim 2, wherein prior to the deposition of Pt atomic clusters on to the surface of the one or more Rh bulk deposits, the support body is pH-adjusted to exhibit a charge which is repulsive to the Pt ions in the slurry or solution.

4. The catalytic device of claim 1, wherein the one or more Rh bulk deposits comprise diameters of about 0.2 nanometers to about 3 nanometers.

5. The catalytic device of claim 1, wherein at least 85% by weight of the Pt atomic clusters comprise up to 10 atoms.

6. The catalytic device of claim 1, wherein the support body consists of a metal oxide and/or a ceramic material.

7. The catalytic device of claim 1, wherein the support body comprises $Al_2O_3$, $ZrO_2$, and combinations thereof.

8. The catalytic device of claim 7, wherein the support body is doped with one or more of La and Nd.

9. The catalytic device of claim 1, wherein the molar ratio of Rh in a bulk Rh deposit to Pt disposed on the surface of that deposit is at least 5:1.

10. The catalytic device of claim 1, wherein the catalytic device comprises a three-way catalyst.

11. A catalytic device, the device comprising:
a support body formed from a porous non-metal material;
one or more Rh bulk deposits disposed on the support body; and
a plurality of Pt atomic clusters disposed on at least one of the Rh bulk deposits, wherein at least 85% by weight of the Pt atomic clusters comprise up to 10 Pt atoms, and the maximum Pt atomic cluster size is 200 Pt atoms.

12. The catalytic device of claim 11, wherein at least 85% by weight of the Pt atomic clusters comprise up to 5 Pt atoms.

13. The catalytic device of claim 11, wherein the maximum Pt atomic cluster size is 50 atoms.

14. The catalytic device of claim 11, wherein less than 10% by weight of Pt atomic clusters are disposed directly on the support body.

15. The catalytic device of claim 11, wherein the molar ratio of Rh in a bulk Rh deposit to Pt disposed on the surface of that deposit is at least 5:1.

16. The catalytic device of claim 11, wherein the catalytic device is configured to treat exhaust gas generated by an internal combustion engine that.

17. A bimetallic three-way catalyst device (TWC) configured to treat exhaust gas generated by a gasoline internal combustion engine, the bimetallic three-way catalyst device comprising:
a canister;
a support body disposed within the canister; wherein the support body is formed from a porous non-metal material;
a plurality of Rh bulk deposits disposed on the support body; and
a plurality of Pt atomic clusters disposed on at least one of the Rh bulk deposits, wherein at least 85% by weight of the Pt atomic clusters comprise up to 10 Pt atoms, and the maximum Pt atomic cluster size is 200 Pt atoms.

18. The bimetallic TWC of claim 17, wherein the combined loading of Rh and Pt is less than 1.5% by weight relative to the weight of the support body.

19. The bimetallic TWC of claim 17, wherein the gasoline internal combustion engine powers a vehicle.

20. The bimetallic TWC of claim 17, wherein the molar ratio of Rh in a bulk Rh deposit to Pt disposed on the surface of that deposit is at least 5:1.

* * * * *